United States Patent
Shi

(10) Patent No.: US 12,323,729 B2
(45) Date of Patent: Jun. 3, 2025

(54) ROLLABLE AND HIDDEN LASER TELEVISION INTEGRATED MACHINE

(71) Applicant: JIANGSU SHUNHE INTERNET OF THINGS TECHNOLOGY CO., LTD., Hai'an (CN)

(72) Inventor: Yuehua Shi, Hai'an (CN)

(73) Assignee: JIANGSU SHUNHE INTERNET OF THINGS TECHNOLOGY CO., LTD., Hai'an (CN)

( * ) Notice: Subject to any disclaimer, the term of this patent is extended or adjusted under 35 U.S.C. 154(b) by 727 days.

(21) Appl. No.: 17/927,752

(22) PCT Filed: Sep. 10, 2020

(86) PCT No.: PCT/CN2020/114415
§ 371 (c)(1),
(2) Date: Nov. 25, 2022

(87) PCT Pub. No.: WO2021/068704
PCT Pub. Date: Apr. 15, 2021

(65) Prior Publication Data
US 2023/0239425 A1 Jul. 27, 2023

(30) Foreign Application Priority Data

Oct. 8, 2019 (CN) .......................... 201910949037.1

(51) Int. Cl.
*G03B 21/58* (2014.01)
*G03B 21/10* (2006.01)
(Continued)

(52) U.S. Cl.
CPC ............... *H04N 5/64* (2013.01); *G03B 21/58* (2013.01); *H04N 9/3161* (2013.01)

(58) Field of Classification Search
CPC ...... G03B 21/58; G03B 21/10; H04N 9/3141; H04N 9/3173
See application file for complete search history.

(56) References Cited

U.S. PATENT DOCUMENTS

| | | | |
|---|---|---|---|
| 7,413,312 B2 * | 8/2008 | Engle | G03B 21/145 348/E5.143 |
| 8,023,187 B1 * | 9/2011 | Tsai Chen | A47B 81/00 359/461 |
| 2006/0290897 A1 | 12/2006 | Engle et al. | |

FOREIGN PATENT DOCUMENTS

| | | |
|---|---|---|
| CN | 205656418 U | 10/2016 |
| CN | 107802109 A | 3/2018 |

(Continued)

*Primary Examiner* — Ryan D Howard
(74) *Attorney, Agent, or Firm* — Bayramoglu Law Offices LLC

(57) ABSTRACT

Disclosed is a rollable and hidden laser television integrated machine. An electric panel opening mechanism, a screen lifting mechanism, a screen rolling and collecting mechanism, and a laser projection display device are arranged inside a television integrated machine main body. The screen lifting mechanism is movably arranged in a lifting groove. The top end of the screen is connected to the screen lifting mechanism, and the bottom end of the screen is connected to the screen rolling and collecting mechanism. A projection groove is formed at the middle position of the upper surface of the television integrated machine main body, and the top end of the electric panel opening mechanism is movably arranged in the projection groove. The laser projection display device is arranged under the electric panel opening mechanism. The middle portion of the box body is provided with a sound transmission mesh plate.

8 Claims, 6 Drawing Sheets

(51) Int. Cl.
*H04N 5/64* (2006.01)
*H04N 9/31* (2006.01)

(56) References Cited

FOREIGN PATENT DOCUMENTS

| | | |
|---|---|---|
| CN | 207065009 U | 3/2018 |
| CN | 109480510 A | 3/2019 |
| CN | 110572598 A | 12/2019 |
| CN | 210225597 U | 3/2020 |

\* cited by examiner

ROLLABLE AND HIDDEN LASER TELEVISION INTEGRATED MACHINE

CROSS REFERENCE TO THE RELATED APPLICATIONS

This application is the national phase entry of International Application No. PCT/CN2020/114415, filed on Sep. 10, 2020, which is based upon and claims priority to Chinese Patent Application No. 201910949037.1, filed on Oct. 8, 2019, the entire contents of which are incorporated herein by reference.

TECHNICAL FIELD

The present invention relates to the technical field of rollable and hidden laser television integrated machines and more particularly to a rollable and hidden laser television integrated machine.

BACKGROUND

There are some problems with the use of traditional laser television. First, the laser television placed directly on the table is easily displaced, and displacement may lead to the offset of an image from the laser television projection, which may need to be readjusted to re-position the picture on the laser television. Second, the traditional laser television requires a deep distance in the direction of depth in use, but the traditional television cabinet cannot reach the required distance of the laser television. Third, the traditional laser television screen needs to be installed separately and fixed to the wall when it is in use, and the second site drilling is required for the installation of the television screen.

SUMMARY

Technical Problem

The market has provided some solutions to solve the problems of collision displacement issues and insufficient depth distance issues of the laser television through a translation structure to hide the laser television inside a box. There is also an electric lifting screen device on the market, but the screen lifting has the problem that the upper and lower positions cannot be adjusted, and the support strength is insufficient in the height direction. However, no television integrated machine can solve the problem of both insufficient depth direction distance and adjustable height. Therefore, improved technology is urgently needed to solve the problem in the prior art.

Solution for Solving the Problem

Technical Solution

An objective of the present invention is to provide a rollable and hidden laser television integrated machine and a translation structure to solve the problems of collision displacement issues and insufficient depth distance issues of the laser television. In the present invention, a sound transmission mesh plate is arranged in the front area of the laser television, which not only ensures the sound transmission of the laser television but also solves the problem of heat dissipation. The present invention also relates to a screen that can be rolled up and down. The rollable screen is controlled by two sets of motors. One set of motors controls the screen rising and lowering, and another set of motors controls the screen rolling. There is also another control mode of the screen lifting, that is, a set of motors controls the screen rising and lowering, and the screen storage is realized by a preload spring. The screen lifting device is different from the traditional lifting device in that the screen is directly integrated with the laser television integrated machine, which solves the problem of secondary screen installation and has the advantage of no need for on-site installation. The multi-link reinforcement design and the gear transmission are employed to ensure accurate transmission and accurate movement of the television screen to solve the problems proposed in the above background technology.

In order to achieve the above objective, the present invention provides the following technical solution. A rollable and hidden laser television integrated machine includes a television integrated machine main body, a horizontal plate, a storage chamber, a projection groove, an electric panel opening mechanism, a screen lifting mechanism, a screen rolling and collecting mechanism, a screen, a lifting groove, vertical plates, side chambers, a middle chamber, a middle sound transmission mesh plate, a connecting block, and a laser projection display device. The horizontal plate is arranged inside the television integrated machine main body, and the storage chamber is arranged under the horizontal plate inside the television integrated machine main body. The electric panel opening mechanism, the screen lifting mechanism, and the screen rolling and collecting mechanism are arranged inside the television integrated machine main body. The screen rolling and collecting mechanism is arranged under the screen lifting mechanism. The lifting groove is formed at one end of the upper surface of the television integrated machine main body, and the screen lifting mechanism is movably arranged in the lifting groove. The top end of the screen is connected to the screen lifting mechanism, and the bottom end of the screen is connected to the screen rolling and collecting mechanism. The projection groove is formed at the middle position of the upper surface of the television integrated machine main body, and the top end of the electric panel opening mechanism is movably arranged in the projection groove. The space above the horizontal plate inside the television integrated machine main body is divided by the two vertical plates installed symmetrically to form the two side chambers and the middle chamber. The television integrated machine main body is provided with a sound groove at the upper end of the surface of the middle chamber, and the middle sound transmission mesh plate is installed in the sound groove. The connecting block is arranged on one side of the television integrated machine main body, and the electric panel opening mechanism at the internal upper end of the television integrated machine main body is further provided with the laser projection display device.

Preferably, the electric panel opening mechanism includes a lifting panel mechanism and a translation panel mechanism.

Preferably, the lifting panel mechanism includes a first drive motor, a lifting screw, a drive screw nut, a lifting guide rail assembly, and a lifting aluminum alloy panel. The first drive motor is connected to a bevel gear at the bottom of the lifting screw through a bevel gear on a lifting drive rod. The lifting screw is provided with the drive screw nut. The drive screw nut is movably connected to the lifting guide rail assembly installed on the vertical plates. The drive screw nut is further connected to the lifting aluminum alloy panel through a connecting piece.

Preferably, the translation panel mechanism includes a second drive motor, a synchronous belt assembly, a translation slider assembly, a translation guide rail assembly, and a translation aluminum alloy panel. The second drive motor and the translation slider assembly are connected to the synchronous belt assembly. The translation slider assembly is movably connected to the translation guide rail assembly installed horizontally on the vertical plates. The translation slider assembly is further connected to the translation aluminum alloy panel through a connecting piece.

Preferably, the screen lifting mechanism includes a third drive motor, a screw, a drive screw assembly, a first connecting rod gear pair, a first gear, a second connecting rod gear pair, a second gear, a screen fixing rod, a drive connecting rod, a connecting piece, a driven connecting rod, and a base. The third drive motor is connected to the screw and is installed on the base. The drive screw assembly is movably arranged on the screw. The drive screw assembly is connected to one end of the first connecting rod gear pair through the drive connecting rod, and the other end of the first connecting rod gear pair engages with the second gear through the first gear. The second gear is installed at one end of the second connecting rod gear pair, and the other end of the second connecting rod gear pair is movably connected to the lower surface of the screen fixing rod. The first gear and the second gear are both connected to the connecting piece. The driven connecting rod is connected to the first connecting rod gear pair, and two ends of the driven connecting rod are connected to the connecting piece and the base, respectively.

Preferably, the screen rolling and collecting mechanism includes roller support bases, a screen roller, a screen guide shaft, and fourth drive motors. The roller support bases are installed inside the television integrated machine main body, and the screen roller and the screen guide shaft are installed between the two roller support bases. The fourth drive motors are arranged on the outer side of the roller support bases. The two fourth drive motors are respectively connected to two ends of the screen roller, and the rotating speed of the fourth drive motors is matched with the lifting speed of the screen lifting mechanism.

Preferably, the connecting block is connected to the electric panel opening mechanism, the screen lifting mechanism, the screen rolling and collecting mechanism, and the laser projection display device, respectively. The connecting block is provided with a power interface, a network interface, and a serial port.

Preferably, a method for using the rollable and hidden laser television integrated machine includes the following steps:

step 1: installing the screen lifting mechanism on the rear end of the television integrated machine main body, installing the electric panel opening mechanism in the projection groove on the upper surface of the television integrated machine main body, and installing the screen rolling and collecting mechanism inside and at the bottom of the television integrated machine main body;

step 2: connecting the top end of the screen to the screen fixing rod of the screen lifting mechanism and allowing the bottom end of the screen to wind around the screen guide shaft of the screen rolling and collecting mechanism and then be connected to the screen roller;

step 3: driving, by the third drive motor, the screen lifting mechanism to raise the screen fixing rod and then installing the laser projection display device inside the television integrated machine main body under the translation aluminum alloy panel;

step 4: through the cooperation of the first drive motor and the second drive motor, lowering the lifting aluminum alloy panel, translating the translation aluminum alloy panel to be located above the lifting aluminum alloy panel, and adjusting and fixing the angle of the laser projection display device;

step 5: arranging a speaker inside the middle chamber and connecting the speaker to the laser projection display device;

step 6: when preparing to watch television, raising the screen lifting mechanism, allowing the screen rolling and collecting mechanism to cooperate to perform feeding, lowering the lifting aluminum alloy panel of the electric panel opening mechanism, translating the translation aluminum alloy panel to be located above the lifting aluminum alloy panel, and turning on the laser projection display device; and step 7: when turning off the television, turning off the laser projection display device and lowering the screen lifting mechanism, so that the screen fixing rod is exactly stopped in the lifting groove; cooperating to perform rolling by the screen rolling and collecting mechanism and returning the translation aluminum alloy panel of the electric panel opening mechanism; and raising the lifting aluminum alloy panel and stopping the translation aluminum alloy panel and the lifting aluminum alloy panel in the projection groove, that is, the screen lifting mechanism is stored in the television integrated machine main body, and the projection groove and the lifting groove on the upper surface of the television integrated machine main body are both in a closed state.

Advantages of the Present Invention

Advantages

Compared with the prior art, the advantages of the present invention are as follows:

(1) The screen is built into the laser television integrated machine, which is easy to use and holes do not need to be drilled to install the screen.

(2) The lifting screen adopts the connecting rod and gear structure to improve the accuracy of the motion position and ensure the accurate adjustment of the lifting height of the screen. Moreover, the height position can be adjusted up and down and can be saved in any position.

(3) The electric panel opening mechanism and the screen lifting mechanism are built-in and hidden, which can be raised remotely when in use and hidden when not in use.

(4) The screen lifting mechanism, the electric panel opening mechanism, the screen rolling and collecting mechanism, and the laser projector can be synchronously turned on or off according to the present invention.

(5) The screen lifting mechanism, the electric panel opening mechanism, the screen rolling and collecting mechanism, and the hidden laser projector are integrated into the same machine with a small volume and a small space.

(6) The middle portion of the box body is provided with a sound transmission mesh plate, which not only ensures the laser sound effect but also solves the problem of heat dissipation.

Figure 1:
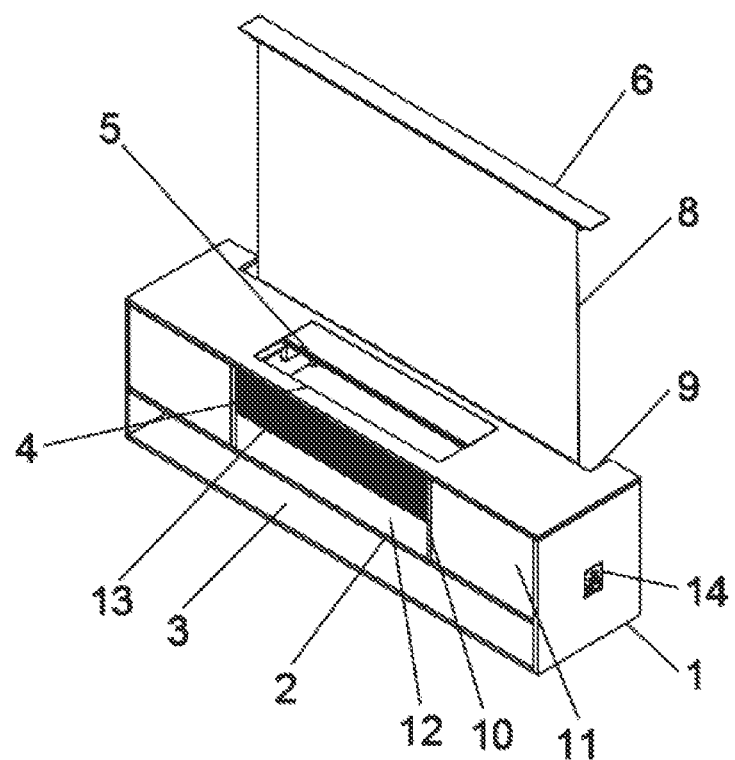
FIG. 1 is a schematic diagram of a three-dimensional structure (turn-on state) of the present invention.
Figure 2:
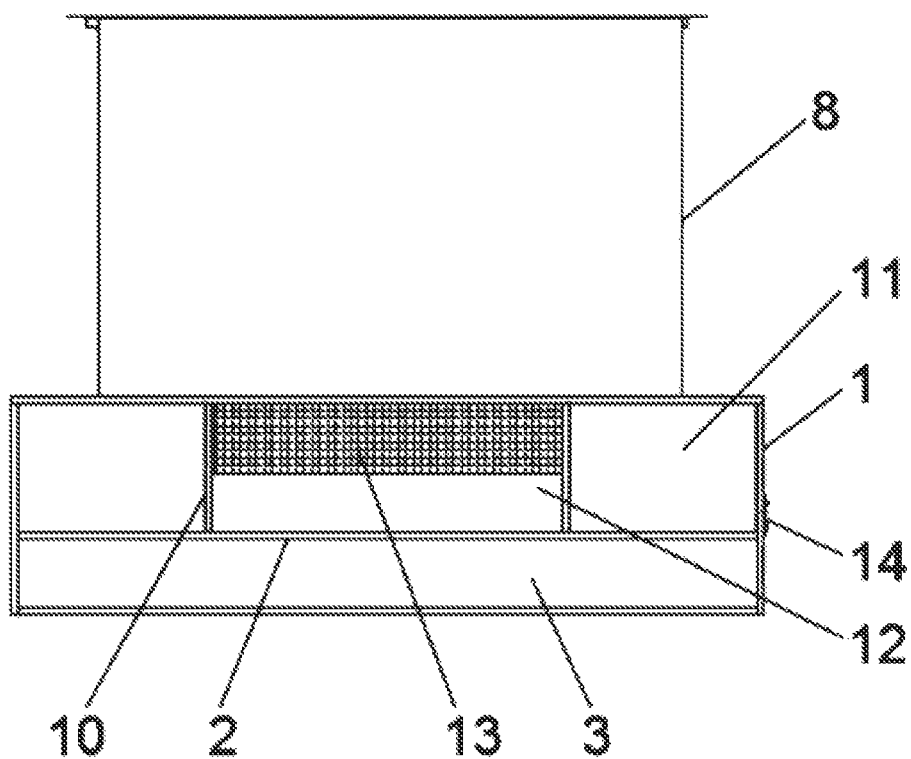
FIG. 2 is a front view of the structure of the present invention.
Figure 3:
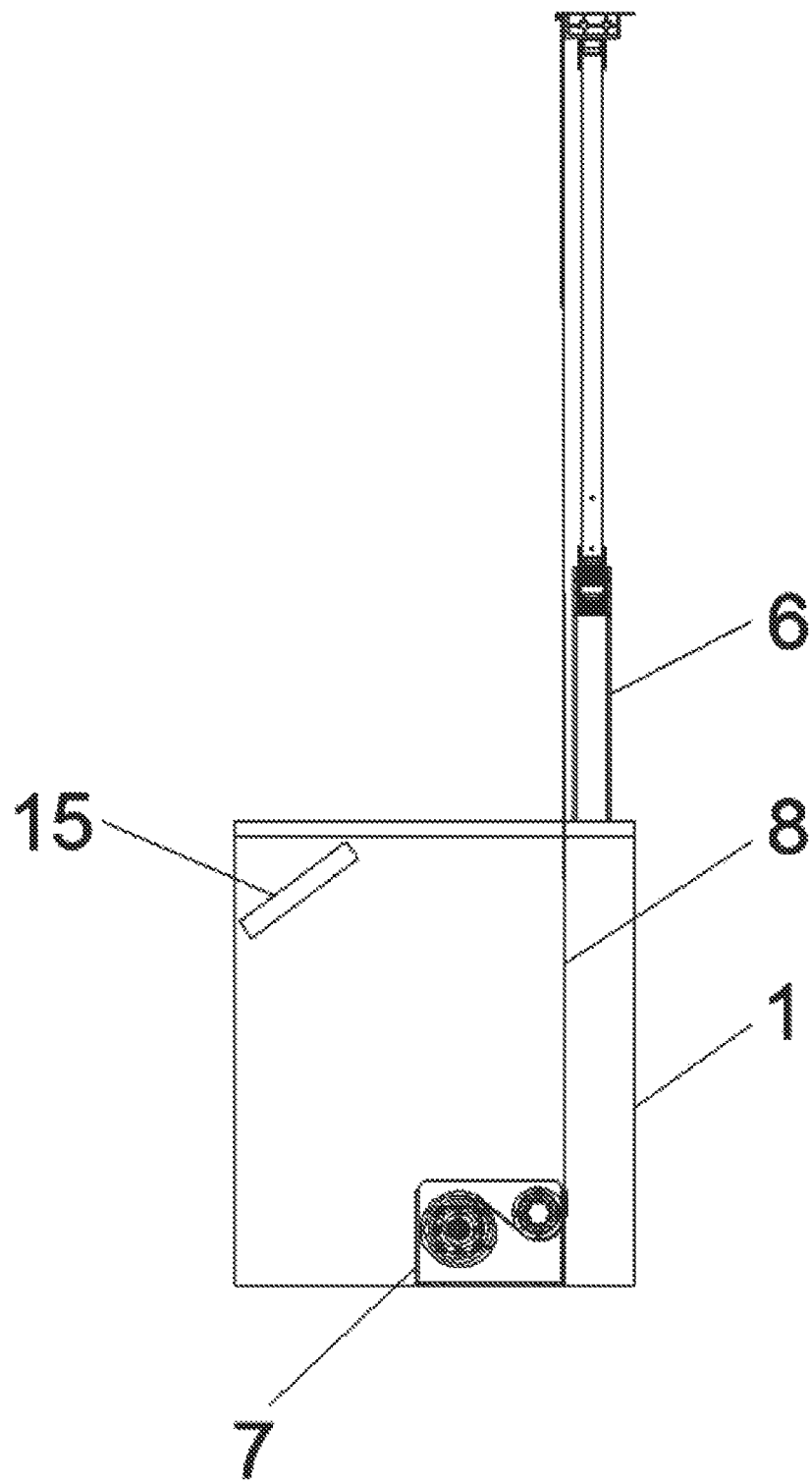
FIG. 3 is a side view of the structure of the present invention.
Figure 4:
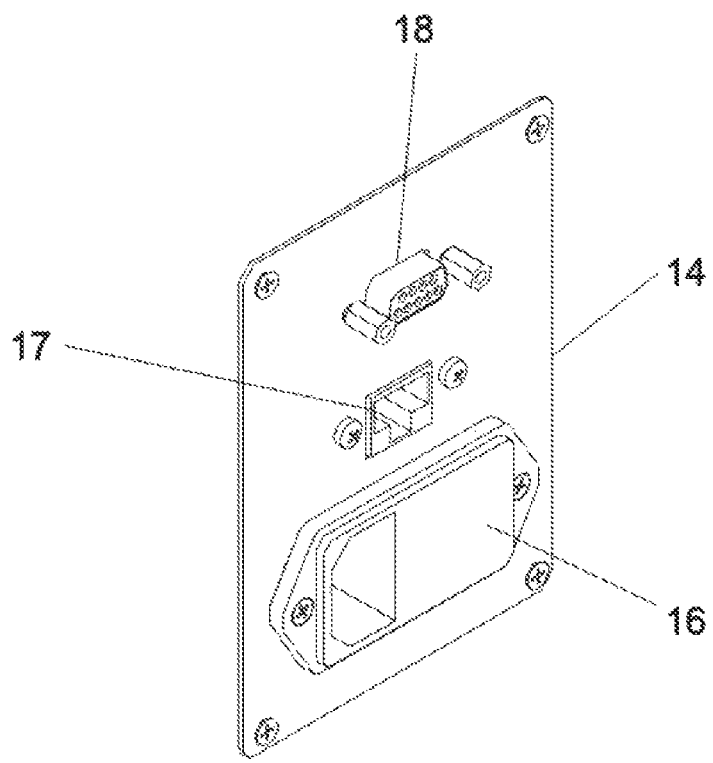
FIG. 4 is a schematic diagram of the structure of a connecting block.

In the figures: television integrated machine main body 1, horizontal plate 2, storage chamber 3, projection groove 4, electric panel opening mechanism 5, screen lifting mechanism 6, screen rolling and collecting mechanism 7, screen 8, lifting groove 9, vertical plate 10, side chamber 11, middle chamber 12, middle sound transmission mesh plate 13, connecting block 14, laser projection display device 15, power interface 16, network interface 17, serial port 18, lifting panel mechanism 51, translation panel mechanism 52, first drive motor 511, lifting screw 512, drive screw nut 513, lifting guide rail assembly 514, lifting aluminum alloy panel 515, second drive motor 521, synchronous belt assembly 522, translation slider assembly 523, translation guide rail assembly 524, translation aluminum alloy panel 525, third drive motor 61, screw 62, drive screw assembly 63, first connecting rod gear pair 64, first gear 65, second connecting rod gear pair 66, second gear 67, screen fixing rod 68, drive connecting rod 69, connecting piece 610, driven connecting rod 611, base 612, roller support base 71, screen roller 72, screen guide shaft 73, and fourth drive motor 74.

DETAILED DESCRIPTION OF THE EMBODIMENTS

The technical solution in the embodiments of the present invention will be clearly and completely described below in combination with the drawings in the embodiments of the present invention. The described embodiments are only part of the embodiments of the present invention, not all embodiments.

based on the embodiments of the present invention, all other embodiments obtained by those skilled in the art without creative labor shall fall within the scope of the protection of the present invention.

Referring to FIGS. 1-4, the present invention provides the following technical solution. A rollable and hidden laser television integrated machine includes the television integrated machine main body 1, the horizontal plate 2, the storage chamber 3, the projection groove 4, the electric panel opening mechanism 5, the screen lifting mechanism 6, the screen rolling and collecting mechanism 7, the screen 8, the lifting groove 9, the vertical plates 10, the side chambers 11, the middle chamber 12, the middle sound transmission mesh plate 13 and the connecting block 14. The horizontal plate 2 is arranged inside the television integrated machine main body 1, and the storage chamber 3 is arranged under the horizontal plate 2 inside the television integrated machine main body 1. The electric panel opening mechanism 5, the screen lifting mechanism 6, and the screen rolling and collecting mechanism 7 are arranged inside the television integrated machine main body 1. The screen rolling and collecting mechanism 7 is arranged under the screen lifting mechanism 6. The lifting groove 9 is formed at one end of the upper surface of the television integrated machine main body 1, and the screen lifting mechanism 6 is movably arranged in the lifting groove 9. The top end of the screen 8 is connected to the screen lifting mechanism 6, and the bottom end of the screen 8 is connected to the screen rolling and collecting mechanism 7. The projection groove 4 is formed at the middle position of the upper surface of the television integrated machine main body 1, and the top end of the electric panel opening mechanism 5 is movably arranged in the projection groove 4. The space above the horizontal plate 2 inside the television integrated machine main body 1 is divided by the two vertical plates 10 installed symmetrically to form the two side chambers 11 and the middle chamber 12. The television integrated machine main body 1 is provided with a sound groove at the upper end of the surface of the middle chamber 12, and the middle sound transmission mesh plate 13 is installed in the sound groove. The connecting block 14 is arranged on one side of the television integrated machine main body 1. The electric panel opening mechanism 5 at the internal upper end of the television integrated machine main body 1 is further provided with the laser projection display device 15. The connecting block 14 is respectively connected to the electric panel opening mechanism 5, the screen lifting mechanism 6, the screen rolling and collecting mechanism 7, and the laser projection display device 15. The connecting block 14 is provided with the power interface 16, the network interface 17, and the serial port 18. Specifically, the serial port 18 is a control interface of the whole machine and is configured to be an interface for connecting to an intelligent central control.

Figure 5:
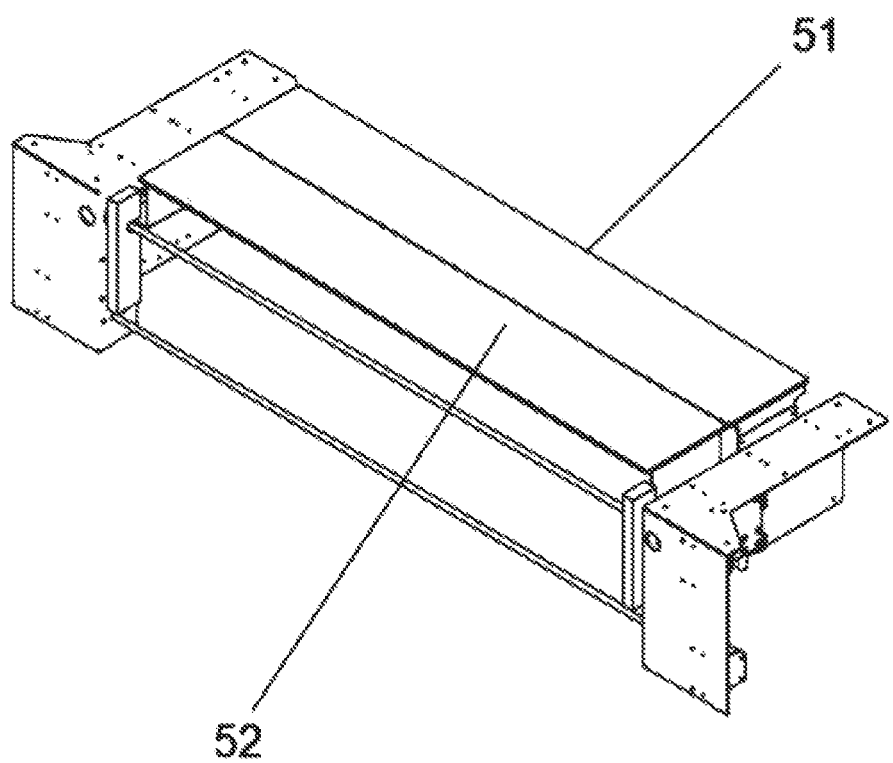
FIG. 5 is a schematic diagram of the structure of an electric panel opening mechanism.

As shown in FIG. 5, the electric panel opening mechanism 5 includes the lifting panel mechanism 51 and the translation panel mechanism 52.

Figure 6:
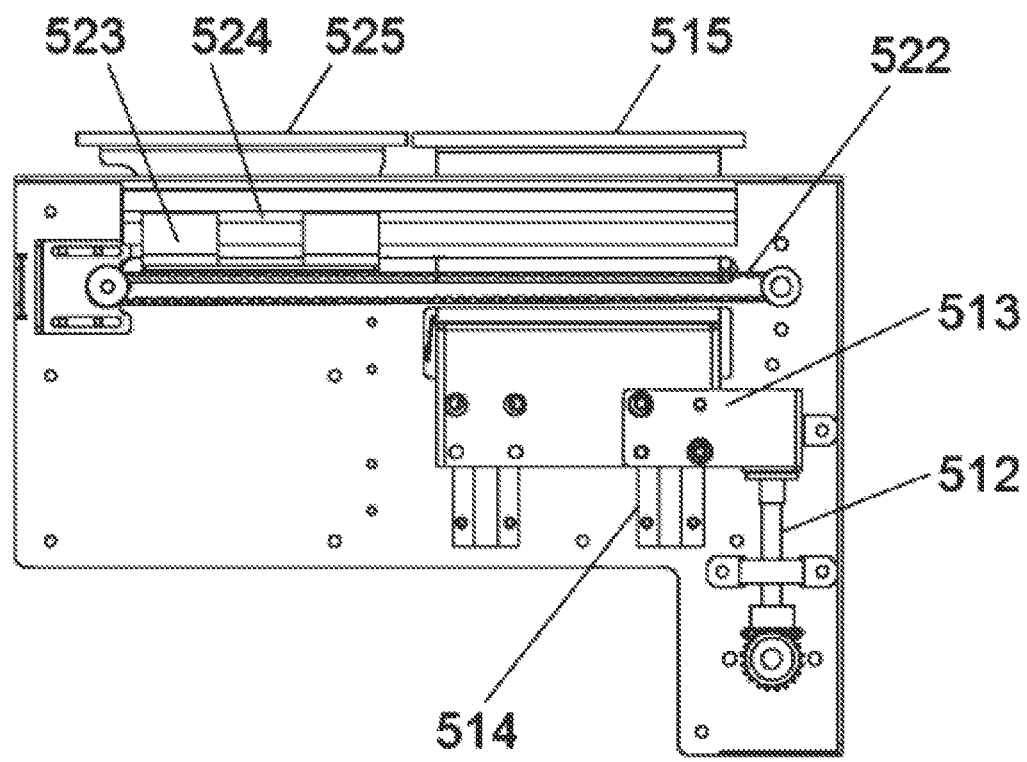
FIG. 6 is a schematic diagram of the structure of a lifting panel mechanism.

As shown in FIG. 6, the lifting panel mechanism 51 includes the first drive motor 511, the lifting screw 512, the drive screw nut 513, the lifting guide rail assembly 514, and the lifting aluminum alloy panel 515. The first drive motor 511 is connected to a bevel gear at the bottom of the lifting screw 512 through a bevel gear on the lifting drive rod. The lifting screw 512 is provided with the drive screw nut 513. The drive screw nut 513 is movably connected to the lifting guide rail assembly 514 installed on the vertical plates 10. The drive screw nut 513 is further connected to the lifting aluminum alloy panel 515 through a connecting piece.

Figure 7:
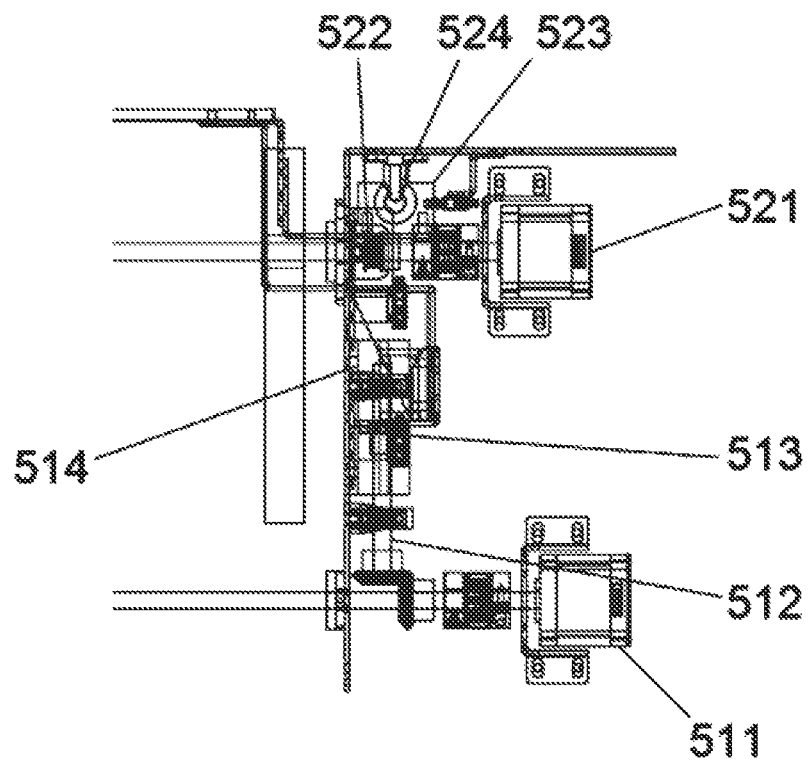
FIG. 7 is a schematic diagram of the structure of a translation panel mechanism.

As shown in FIG. 7, the translation panel mechanism 52 includes the second drive motor 521, the synchronous belt assembly 522, the translation slider assembly 523, the translation guide rail assembly 524, and the translation aluminum alloy panel 525. The second drive motor 521 and the translation slider assembly 523 are connected to the synchronous belt assembly 522. The translation slider assembly 523 is movably connected to the translation guide rail assembly 524 installed horizontally on the vertical plates 10. The translation slider assembly 523 is further connected to the translation aluminum alloy panel 525 through a connecting piece.

Figure 8:
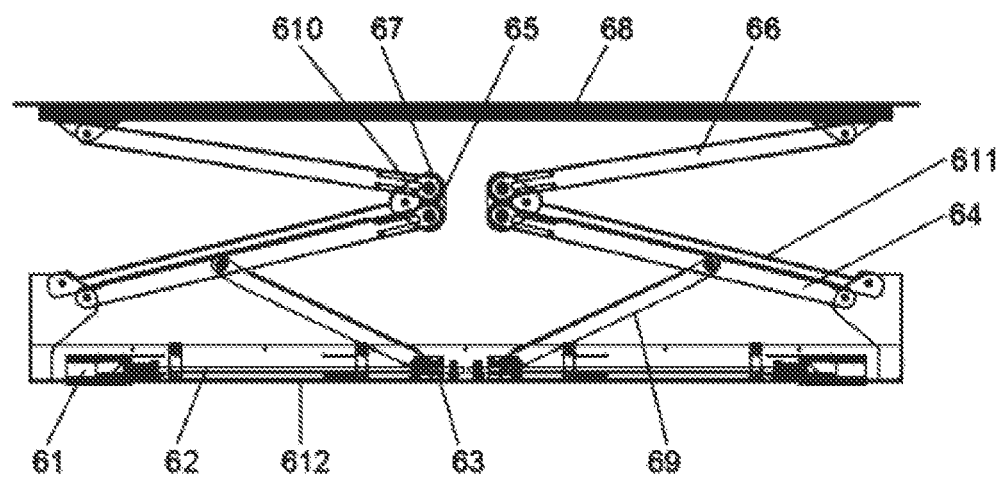
FIG. 8 is a schematic diagram of the structure of a screen lifting mechanism.

As shown in FIG. 8, the screen lifting mechanism 6 includes the third drive motor 61, the screw 62, the drive screw assembly 63, the first connecting rod gear pair 64, the first gear 65, the second connecting rod gear pair 66, the second gear 67, the screen fixing rod 68, the drive connecting rod 69, the connecting piece 610, the driven connecting rod 611 and the base 612. The third drive motor 61 is connected to the screw 62, and the third drive motor 61 is installed on the base 612. The drive screw assembly 63 is movably arranged on the screw 62. The drive screw assembly 63 is connected to one end of the first connecting rod gear pair 64 through the drive connecting rod 69, and the other end of the first connecting rod gear pair 64 engages with the second gear 67 through the first gear 65. The second gear 67 is installed at one end of the second connecting rod gear pair 66; the other end of the second connecting rod gear pair 66 is movably connected to the lower surface of the screen fixing rod 68. The first gear 65 and the second gear 67 are both connected to the connecting piece 610. The driven connecting rod 611 is connected to the first connecting rod gear pair 64, and two ends of the driven connecting rod 611 are connected to the connecting piece 610 and the base 612, respectively.

Figure 9:
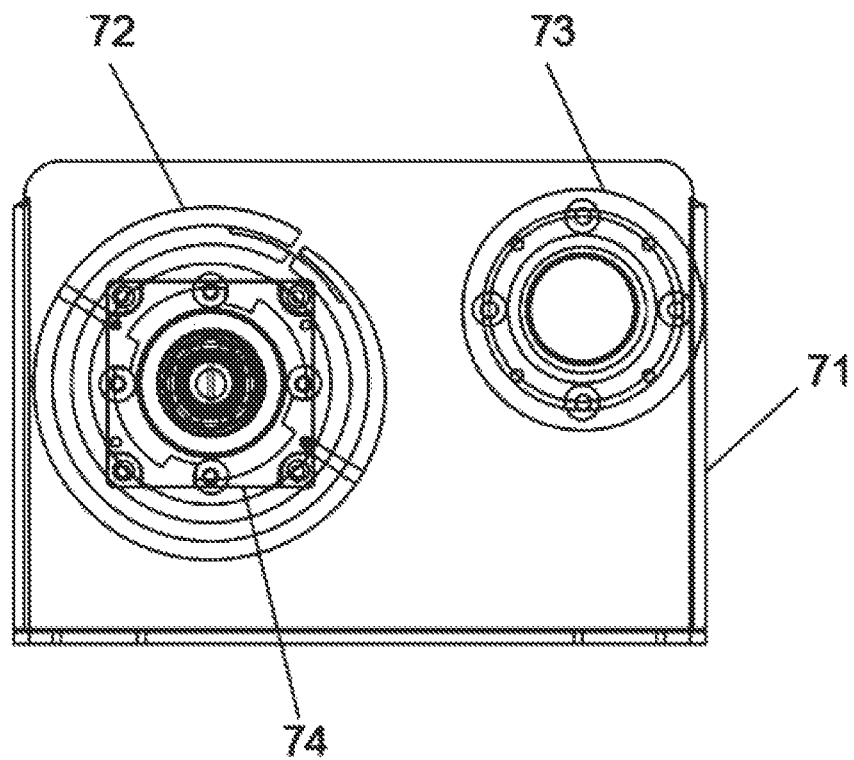
FIG. 9 is a schematic diagram of the structure of a screen rolling and collecting mechanism.

As shown in FIG. 9, the screen rolling and collecting mechanism 7 includes the roller support bases 71, the screen roller 72, the screen guide shaft 73, and the fourth drive motors 74. The roller support bases 71 are installed inside the television integrated machine main body 1. The screen roller 72 and the screen guide shaft 73 are installed between the two roller support bases 71. The fourth drive motors 74 are arranged on the outer side of the roller support bases 71. The two fourth drive motors 74 are respectively connected to two ends of the screen roller 72, and the rotating speed of the fourth drive motors 74 is matched with the lifting speed of the screen lifting mechanism 6. Specifically, the fourth drive motors 74 can also use a coil spring, but the selection of the motor has higher precision.

A method for using the rollable and hidden laser television integrated machine includes the following steps:

Step 1: The screen lifting mechanism 6 is installed on the rear end of the television integrated machine main body 1. The electric panel opening mechanism 5 is installed in the projection groove 4 on the upper surface of the television integrated machine main body 1. The screen rolling and collecting mechanism 7 is installed inside and at the bottom of the television integrated machine main body 1.

Step 2: The top end of the screen 8 is connected to the screen fixing rod 68 of the screen lifting mechanism 6, and the bottom end of the screen 8 winds around the screen guide shaft 73 of the screen rolling and collecting mechanism 7 and then is connected to the screen roller 72.

Step 3: The screen lifting mechanism 6 is driven by the third drive motor 61 to raise the screen fixing rod 68. Subsequently, the laser projection display device 15 is installed inside the television integrated machine main body 1 and is located under the translation aluminum alloy panel 525.

Step 4: Through the cooperation of the first drive motor 511 and the second drive motor 521, the lifting aluminum alloy panel 515 is lowered, the translation aluminum alloy panel 525 is translated to be located above the lifting aluminum alloy panel 515, and the angle of the laser projection display device 15 is adjusted and fixed.

Step 5: The speaker is arranged inside the middle chamber 12 and connected to the laser projection display device 15.

Step 6: When preparing to watch television, the screen lifting mechanism 6 is raised, the screen rolling and collecting mechanism 7 performs feeding, the lifting aluminum alloy panel 515 of the electric panel opening mechanism 5 is lowered, the translation aluminum alloy panel 525 is translated above to be located above the lifting aluminum alloy panel 515, and the laser projection display device 15 is turned on.

Figure 10:
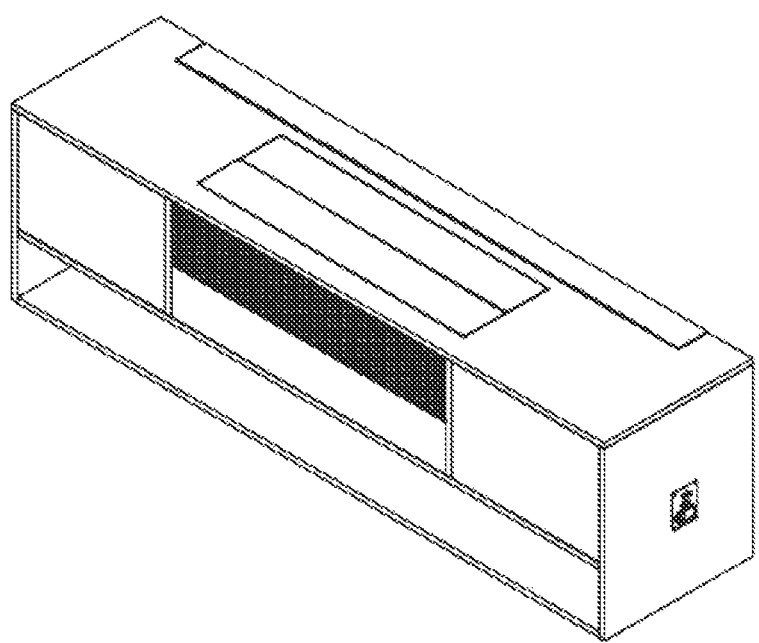
FIG. 10 is a schematic diagram of the structure (closed state) of the present invention.

Step 7: When turning off the television, the laser projection display device 15 is turned off, the screen lifting mechanism 6 is lowered so that the screen fixing rod 68 is exactly stopped in the lifting groove 9, the screen rolling and collecting mechanism 7 performs rolling, the translation aluminum alloy panel 525 of the electric panel opening mechanism 5 returns, and the lifting aluminum alloy panel 515 raises. The translation aluminum alloy panel 525 and the lifting aluminum alloy panel 515 are stopped in the projection groove 4; that is, the screen lifting mechanism 6 is stored in the television integrated machine main body 1, and the projection groove 4 and the lifting groove 9 on the upper surface of the television integrated machine main body 1 are both in a closed state, as shown in FIG. 10.

The present invention provides a laser television integrated machine that mainly integrates the laser television and the screen to solve the problem that the screen needs to be installed on the wall, which would require drilled holes for installation. The present invention relates to the electric lifting screen. The electric screen lifting structure adopts the connecting rod and gear drive structure. The screen can be raised and lowered automatically by remote control, while the screen lifting can also be linked with the laser television.

Although embodiments of the present invention have been shown and described for those skilled in the art, it is apparent that a variety of changes, modifications, replacements, and variants may be made to these embodiments without departing from the principle and spirit of the present invention, and the scope of the present invention is defined by the appended claims and their equivalents.

What is claimed is:

1. A rollable and hidden laser television integrated machine, comprising: a television integrated machine main body, a horizontal plate, a storage chamber, a projection groove, an electric panel opening mechanism, a screen lifting mechanism, a screen rolling and collecting mechanism, a screen, a lifting groove, vertical plates, side chambers, a middle chamber, a middle sound transmission mesh plate, a connecting block, and a laser projection display device; wherein the horizontal plate is arranged inside the television integrated machine main body, and the storage chamber is arranged under the horizontal plate inside the television integrated machine main body; the electric panel opening mechanism, the screen lifting mechanism, and the screen rolling and collecting mechanism are arranged inside the television integrated machine main body; the screen rolling and collecting mechanism is arranged under the screen lifting mechanism; the lifting groove is formed at one end of an upper surface of the television integrated machine main body, and the screen lifting mechanism is movably arranged in the lifting groove; a top end of the screen is connected to the screen lifting mechanism, and a bottom end of the screen is connected to the screen rolling and collecting mechanism; the projection groove is formed at a middle position of the upper surface of the television integrated machine main body, and a top end of the electric panel opening mechanism is movably arranged in the projection groove; a space above the horizontal plate inside the television integrated machine main body is divided by two vertical plates installed symmetrically to form two side chambers and the middle chamber; the television integrated machine main body is provided with a sound groove at an upper end of a surface of the middle chamber, and the middle sound transmission mesh plate is installed in the sound groove; the connecting block is arranged on one side of the television integrated machine main body, and the electric panel opening mechanism at an internal upper end of the television integrated machine main body is provided with the laser projection display device.

2. The rollable and hidden laser television integrated machine according to claim 1, wherein the electric panel opening mechanism comprises a lifting panel mechanism and a translation panel mechanism.

3. The rollable and hidden laser television integrated machine according to claim 2, wherein the lifting panel mechanism comprises a first drive motor, a lifting screw, a drive screw nut, a lifting guide rail assembly, and a lifting aluminum alloy panel; wherein the first drive motor is connected to a first bevel gear at a bottom of the lifting screw through a second bevel gear on a lifting drive rod, and the lifting screw is provided with the drive screw nut; the drive screw nut is movably connected to the lifting guide rail assembly installed on the vertical plates; and the drive screw nut is connected to the lifting aluminum alloy panel through a connecting piece.

4. The rollable and hidden laser television integrated machine according to claim 2, wherein the translation panel mechanism comprises a second drive motor, a synchronous belt assembly, a translation slider assembly, a translation guide rail assembly, and a translation aluminum alloy panel; wherein the second drive motor is connected to the synchronous belt assembly, and the translation slider assembly is connected to the synchronous belt assembly; the translation slider assembly is movably connected to the translation guide rail assembly installed horizontally on the vertical plates; and the translation slider assembly is connected to the translation aluminum alloy panel through a connecting piece.

5. The rollable and hidden laser television integrated machine according to claim 1, wherein the screen lifting mechanism comprises a third drive motor, a screw, a drive screw assembly, a first connecting rod gear pair, a first gear, a second connecting rod gear pair, a second gear, a screen fixing rod, a drive connecting rod, a connecting piece, a driven connecting rod, and a base; wherein the third drive motor is connected to the screw, and the third drive motor is installed on the base; the drive screw assembly is movably arranged on the screw; the drive screw assembly is connected to a first end of the first connecting rod gear pair through the drive connecting rod, and a second end of the first connecting rod gear pair engages with the second gear through the first gear; the second gear is installed at a first end of the second connecting rod gear pair, and a second end of the second connecting rod gear pair is movably connected to a lower surface of the screen fixing rod; the first gear and the second gear are connected to the connecting piece; the driven connecting rod is connected to the first connecting rod gear pair, and two ends of the driven connecting rod are connected to the connecting piece and the base, respectively.

6. The rollable and hidden laser television integrated machine according to claim 1, wherein the screen rolling and collecting mechanism comprises roller support bases, a screen roller, a screen guide shaft, and fourth drive motors; wherein the roller support bases are installed inside the television integrated machine main body, and the screen roller and the screen guide shaft are installed between the two roller support bases; the fourth drive motors are arranged on an outer side of the roller support bases; two fourth drive motors are respectively connected to two ends of the screen roller, and a rotating speed of the fourth drive motors is matched with a lifting speed of the screen lifting mechanism.

7. The rollable and hidden laser television integrated machine according to claim 1, wherein the connecting block is connected to the electric panel opening mechanism, the screen lifting mechanism, the screen rolling and collecting mechanism, and the laser projection display device, respectively; and the connecting block is provided with a power interface, a network interface and a serial port.

8. The rollable and hidden laser television integrated machine according to claim 1, wherein a method for using the rollable and hidden laser television integrated machine comprises the following steps:
step (1): installing the screen lifting mechanism on a rear end of the television integrated machine main body, installing the electric panel opening mechanism in the projection groove on the upper surface of the television integrated machine main body, and installing the screen rolling and collecting mechanism on an internal bottom of the television integrated machine main body;
step (2): connecting the top end of the screen to a screen fixing rod of the screen lifting mechanism and allowing the bottom end of the screen to wind around a screen guide shaft of the screen rolling and collecting mechanism and then be connected to the screen roller;
step (3): driving, by the third drive motor, the screen lifting mechanism to raise the screen fixing rod and then installing the laser projection display device inside the television integrated machine main body under a translation aluminum alloy panel;
step (4): through a cooperation of the first drive motor and the second drive motor, lowering a lifting aluminum alloy panel, translating the translation aluminum alloy panel to be located above the lifting aluminum alloy panel, and adjusting and fixing an angle of the laser projection display device;
step (5): arranging a speaker inside the middle chamber and connecting the speaker to the laser projection display device;
step (6): when preparing to watch television, raising the screen lifting mechanism, allowing the screen rolling and collecting mechanism to cooperate to perform feeding, lowering the lifting aluminum alloy panel of the electric panel opening mechanism, translating the translation aluminum alloy panel to be located above the lifting aluminum alloy panel, and turning on the laser projection display device; and
step: when turning off the television, turning off the laser projection display device, lowering the screen lifting mechanism, so that the screen fixing rod is exactly stopped in the lifting groove; cooperating to perform rolling by the screen rolling and collecting mechanism and returning the translation aluminum alloy panel of the electric panel opening mechanism; raising the lifting aluminum alloy panel and stopping the translation aluminum alloy panel and the lifting aluminum alloy panel in the projection groove; wherein the screen lifting mechanism is stored in the television integrated machine main body and the projection groove and the lifting groove on the upper surface of the television integrated machine main body are in a closed state.

* * * * *